United States Patent
Schermeyer

(10) Patent No.: US 10,581,250 B2
(45) Date of Patent: Mar. 3, 2020

(54) SYSTEM FOR GENERATING REAL-TIME INFORMATION AND FORECASTS ON POWER OUTPUT REGULATION DUE TO GRID CONGESTION IN AT LEAST ONE POWER GRID

(71) Applicant: Ubimet GmbH, Karlsruhe (DE)

(72) Inventor: Hans Schermeyer, Berlin (DE)

(73) Assignee: Ubimet GmbH, Karlsruhe (DE)

( * ) Notice: Subject to any disclaimer, the term of this patent is extended or adjusted under 35 U.S.C. 154(b) by 0 days.

(21) Appl. No.: 15/879,326

(22) Filed: Jan. 24, 2018

(65) Prior Publication Data
US 2018/0212431 A1 Jul. 26, 2018

(30) Foreign Application Priority Data
Jan. 24, 2017 (DE) .................. 10 2017 101 265
Jan. 24, 2017 (DE) .................. 20 2017 100 343 U

(51) Int. Cl.
*H02J 3/38* (2006.01)
*H02J 3/00* (2006.01)
(Continued)

(52) U.S. Cl.
CPC ............ *H02J 3/382* (2013.01); *G05B 13/048* (2013.01); *G06Q 50/06* (2013.01); *H02J 3/008* (2013.01);
(Continued)

(58) Field of Classification Search
CPC .... H02J 3/382; H02J 13/0017; H02J 13/0086; H02J 3/008; H02J 2003/007;
(Continued)

(56) References Cited

U.S. PATENT DOCUMENTS

| | | | |
|---|---|---|---|
| 2010/0076613 A1 | 3/2010 | Imes | |
| 2011/0106321 A1* | 5/2011 | Cherian | H02J 3/00 700/286 |

(Continued)

FOREIGN PATENT DOCUMENTS

| | | |
|---|---|---|
| DE | 102010006142 A1 | 8/2011 |
| DE | 102012215565 A1 | 3/2014 |
| WO | 2014066087 A1 | 5/2014 |

OTHER PUBLICATIONS

"Quality of CGMES Datasets and Calculations for System Operations—Second Edition," Entsoe Website, Available Online at https://docstore.entsoe.eu/Documents/CIM_documents/Grid_Model_CIM/QUALITY%200F%20CGMES%20DATASETS%20AND%2OCALCULATIONS%202nd%20edition.pdf, Oct. 12, 2016, 31 pages.

*Primary Examiner* — Ziaul Karim
(74) *Attorney, Agent, or Firm* — McCoy Russell LLP

(57) ABSTRACT

The present disclosure relates to a system for furnishing information, in particular real-time information and/or forecast information, relative to the regulating of the power of at least one power grid, wherein the power grid comprises at least one transmission grid and/or at least one distribution grid and wherein the power grid is operatively connected to a plurality of particularly regenerative or renewable power plants, wherein the system comprises at least one receiver device for receiving data, in particular real-time data and/or forecast data, from at least one electronic database connected to the receiver device via a network, wherein the data is associated with a shut down and/or a downward regulation of the power plants in consequence of a feed-in management of the power grid, wherein the system further comprises a processing and/or computing device for processing the data so that it can be able to be linked and/or made available as information.

9 Claims, 4 Drawing Sheets

(51) Int. Cl.
*G06Q 50/06* (2012.01)
*H02J 13/00* (2006.01)
*G05B 13/04* (2006.01)

(52) U.S. Cl.
CPC ...... *H02J 13/0017* (2013.01); *H02J 13/0086* (2013.01); *H02J 2003/001* (2013.01); *H02J 2003/003* (2013.01); *H02J 2003/007* (2013.01); *Y02B 70/3216* (2013.01); *Y02E 40/72* (2013.01); *Y04S 10/123* (2013.01); *Y04S 10/525* (2013.01); *Y04S 20/221* (2013.01); *Y04S 20/224* (2013.01); *Y04S 50/10* (2013.01)

(58) Field of Classification Search
CPC .......... H02J 2003/003; H02J 2003/001; G05B 13/048; G06Q 50/06; Y02B 70/3216; Y04S 20/221; Y04S 10/123; Y04S 50/10; Y04S 20/224; Y04S 10/525; Y02E 40/72
USPC .................................................. 700/287–297
See application file for complete search history.

(56) References Cited

U.S. PATENT DOCUMENTS

| | | | | |
|---|---|---|---|---|
| 2012/0029720 A1* | 2/2012 | Cherian | .................. | H02J 13/00 700/297 |
| 2013/0043725 A1* | 2/2013 | Birkelund | .............. | G06Q 10/04 307/24 |
| 2013/0166085 A1* | 6/2013 | Cherian | ................. | G05B 13/02 700/291 |
| 2014/0114844 A1* | 4/2014 | Forbes, Jr. | ............. | G05D 17/00 705/39 |

* cited by examiner

SYSTEM FOR GENERATING REAL-TIME INFORMATION AND FORECASTS ON POWER OUTPUT REGULATION DUE TO GRID CONGESTION IN AT LEAST ONE POWER GRID

CROSS REFERENCE TO RELATED APPLICATION

This application claims priority to German Patent Application No. 10 2017 101 265.6, entitled "System For Generating Real-Time Information And Forecasts On Power Output Regulation Due To Grid Congestion In At Least One Power Grid" filed Jan. 24, 2017, and German Utility Model Application No. 20 2017 100 343.4, filed on Jan. 24, 2017, the entire contents of each of which are hereby incorporated by reference in their entirety for all purposes.

TECHNICAL FIELD

The present disclosure relates to a system for providing real-time information and forecasts on power output regulation due to grid congestion in at least one power grid.

BACKGROUND AND SUMMARY

Regulating the power output of a power grid, which can for example be a distribution grid or a transmission grid, is becoming increasingly important as the continuous development of renewable energies, especially in Germany, is increasingly resulting in congestions in the grid, particularly at the decentralized level.

In order to prevent grid congestions, the fluctuating power supply of the grid resulting from the volatile power generation of the renewable power plants is regulated or controlled by so-called feed-in management.

Depending on the grid load, the renewable power plants which have the highest impact on the respective grid congestion are thereby selectively and temporarily shut down, or their feed-in power lowered respectively.

The changes occurring to feed-in power into a power grid due to feed-in management have direct or indirect consequences on the price of electricity as for example traded on the German and European electricity market.

The traders in these electricity markets, e.g. direct-market traders, thus have a legitimate interest in staying informed about the current or future development of the feed-in power of particularly renewable power plants into the power grid. Traders can moreover also encompass non-direct-market electricity traders, transmission system operators and distribution system operators.

Systems able to for example control or regulate the feed-in power of renewable power plants into a power grid are already known from the prior art.

For example, DE 10 2012 215 565 A1 indicates a device and a method for controlling a system pool of power generators having fluctuating predictable feed-in power, in particular of regenerative power generators, for providing a negative control power, in particular a negative tertiary control or secondary control.

Furthermore, DE 10 2010 006 142 A1 indicates an energy portal for controlling or regulating the energy feed-in from a power generator into an energy distribution grid which takes feed-in factors, power generator system metrics and forecast information into account in controlling or regulating operational parameters of the power generator system.

However, particularly the pooling and processing all publicly accessible real-time data of the feed-in management of the respective grid and/or power plant operators as well as providing same as real-time information would be desirable.

Therefore, the present disclosure addresses the task of advantageously developing a system of the type cited at the outset, in particular such that the system provides improved and more informative real-time information in terms of the power regulation of a power grid.

This task is solved according to the present disclosure by a system for furnishing real-time information relative to the regulating of the power of at least one power grid, wherein the power grid comprises at least one transmission grid and/or at least one distribution grid and wherein the power grid is operatively connected to a plurality of particularly regenerative or renewable power plants, wherein the system comprises at least one receiver device for receiving real-time data from at least one electronic database connected to the receiver device via a network, wherein the real-time data is associated with a shut down and/or a downward regulation of the power plants in consequence of a feed-in management of the power grid, wherein the system further comprises a processing and/or computing device for processing the real-time data so that it can be able to be linked and/or made available as real-time information.

The present disclosure is based on the underlying concept of being able to link and/or provide feed-in management data of a power grid in consequence of grid congestion of e.g. a distribution grid in the form of information. The receiver device thereby receives the provided electronic database data over the network and forwards it to the processing and/or computing device which processes the data. The data is real-time data relative to the shutting down and/or downward regulating of specific, particularly regenerative or renewable power plants by the power grid's feed-in management due to grid congestion. The processing and/or computing device can thus make the data available as information in particular for direct-market traders of an electricity market. This information is extremely valuable to electricity market traders since their actions in the electricity market are essentially dependent on the trajectory of electricity prices over time, which is in turn influenced by, among other things, the feed-in management of the power grid. The provided information gives the trader an effective tool enabling him to optimize his actions in the electricity market and thus strengthen his market position. The trader can additionally be provided with highly diverse and individually customized information, e.g. in the form of a time series, thereby enabling further optimizing of the trader's actions in the electricity market.

The information can be real-time information and the data can be real-time data. In this case, system-specific notifications relative to the grid operator's grid congestion management can thus for example be combined with a market master data register as well as the current system-specific generation of wind, solar and biomass. This results in the current power reduction induced for each renewable power plant, which can then be compiled into any desired regions such as control areas, grid nodes or accounting grids using a mapping algorithm.

Alternatively and/or additionally, it is conceivable for the information to be forecast information and the data to be forecast data. In the case of a forecast, however, the system is not dependent on the operational messages of the grid operator or other grid operator electronic databases. The fundamental model of the forecast preferably includes a load flow model which calculates the future grid load (this requires a grid model, a load model and a system-specific power generation model). In a further step, the grid operator's shutdown logic is for example illustrated using a congestion management algorithm.

It can moreover be provided for the receiver device to be connected over the network to multiple, particularly decentralized and publicly accessible electronic databases of respective operators of the power grid and/or power plants. The respective power grid and/or power plant operators publish real-time data on the feed-in management of the applicable grid congestion via respective electronic databases. Since the system is connected to these electronic databases via the network, e.g. the internet, it can particularly simply and advantageously link the publicly available real-time data of widely diverse grid sectors to real-time information. This results in as large of a base of real-time information as possible which gives the trader an even more accurate and extensive illustration of the feed-in management and resultant changes in electricity price.

It is further conceivable for the processing and/or computing device to convert different data formats of the real-time data from the respective electronic databases into a uniform data format. The quality of the real-time data of the different electronic databases can be increased by algorithms which run plausibility checks. The data formats of real-time data provided by the respective operators vary greatly and should therefore advantageously first be standardized by the processing and/or computing device with respect to efficient linking and providing. Moreover, a standardized data format also improves the trader's managing and processing of the real-time information provided.

It is additionally conceivable for the real-time data to be associated with current shutdown and/or downward regulating of a power plant in response to the feed-in management of the power grid. The more precisely the real-time data can illustrate the shutting down and/or downward regulating of the power plant in consequence of the feed-in management, the better and faster the trader can control his actions in the electricity market. It is thus particularly advantageous for the real-time information linked and furnished from the real-time data to be provided in as up-to-the-minute manner as possible.

It is also possible for the processing and/or computing device to link the real-time data of specific power plants as well as their specific current power generation to further data from a market master data register. This linking in particular offers the advantage of being able to very easily and clearly determine the feed-in management-imposed power limiting for each power plant and thus be able to furnish even more detailed and improved real-time information.

In conjunction thereto, it can furthermore be provided for the processing and/or computing device to provide the real-time data for any given power plant resulting from feed-in management and for a mapping algorithm implemented in the processing and/or computing device to link same together for regions such as control areas, grid nodes or accounting grids or for individually given portfolios of potentially affected power plants. The trader being able to link real-time data to real-time information individually and according to his own specific needs is particularly advantageous. This thereby enables the most efficient and targeted real-time information possible to be available to the traders.

It is moreover conceivable for the processing and/or computing device to link the real-time data of one or more specific power plants to generation time series of said associated one or more power plants based on different numerical weather forecast models.

It is furthermore possible for forecast data to be provided on a future shutdown and/or downward regulating of the power plants due to the feed-in management of the power grid. The furnishing of forecast data offers the trader a further tool in addition to the real-time information for further optimizing his actions in the electricity market. Forecast data is current and retrievable data relative to the future shutdown and/or downward regulating of specific, in particular regenerative or renewable power plants by the feed-in management of the power grid due to grid congestion. The forecast horizons of the forecast information can thereby be individually adapted to the action strategy of the trader so as to particularly advantageous support his actions in the electricity market. The forecast horizons of the forecast information can thereby extend from a few hours to several days.

It is furthermore conceivable for the processing and/or computing device to be set up to process model-based data so that same can be linked and/or provided as forecast information, and whereby the forecast information is associated with a future shutdown and/or downward regulating of the power plants as a result of the feed-in management of the power grid. Forecast data is generally provided in decentralized manner by the respective operators of a power grid and can therefore be subject to fluctuations in terms of availability and forecast quality. Thus, a centralized provision of the forecast information yields additionally advantages for the trader with respect to the forecast quality as well as the regional availability of the forecast information.

It can additionally be provided for the forecast information to be able to be determined by means of the processing and/or computing device as well as by means of a load flow model of the power grid implemented therein for calculating its future power feed, wherein a power grid model, a load model as well as a power generation model are provided as input parameters for the load flow model. Particularly important and advantageous for the providing of forecast information is for information to be generated on where and when which load will occur in the power grid and what impact such load will have on the power grid. Since the input parameters in particular are mainly responsible for improving the quality of the model, the most precise information possible on these parameters is particularly important in order to improve the model quality in the provision of forecast information.

It is further conceivable for the processing and/or computing device to be able to determine power consumption time series for industrial, commercial and residential loads on the basis of the load model, and the processing and/or computing device to be able to determine power generation time series on the basis of the power generation model in the form of power generation forecasts for the power plants based on different numerical weather forecasts as well as for further baseload power plants. Both the load model as well as the power generation model furnish a very good compromise of model complexity and expected model quality, particularly for realistic implementation or calculation. Furthermore, these models can be easily improved by future implementations and validations based on real-time information.

It is also conceivable for the forecast information to be able to be determined by means of the load flow model implemented in the processing and/or computing device based on the one or more power plants which have a maximum nodal impact on congestion in the power grid.

Determining the maximum nodal impact of the respective power plant enables particularly efficient and easy identifying of those power plant(s) the future feed-in management will shut down or regulate downward.

A congestion management algorithm is preferably used to select the power plants having a maximum nodal impact on a congestion of the power grid.

Moreover, it is possible for the processing and/or computing device to provide the forecast information on any given power plant and any desired forecast horizons resulting from feed-in management and for a mapping algorithm implemented in the processing and/or computing device to link same together for regions such as control areas, grid nodes or accounting grids or for individually given portfolios of potentially affected power plants. The trader being able to link the forecast data to the corresponding forecast information individually and according to his own specific needs is particularly advantageous. This thereby enables the most efficient and targeted forecast information possible to be available to the trader(s). The forecast horizons can span any desired periods. The ranges can for example be minutes, hours or even a few days.

The following will make reference to an example embodiment depicted in the figures in describing further specifics and advantages of the present disclosure in greater detail.

DETAILED DESCRIPTION

Figure 1:
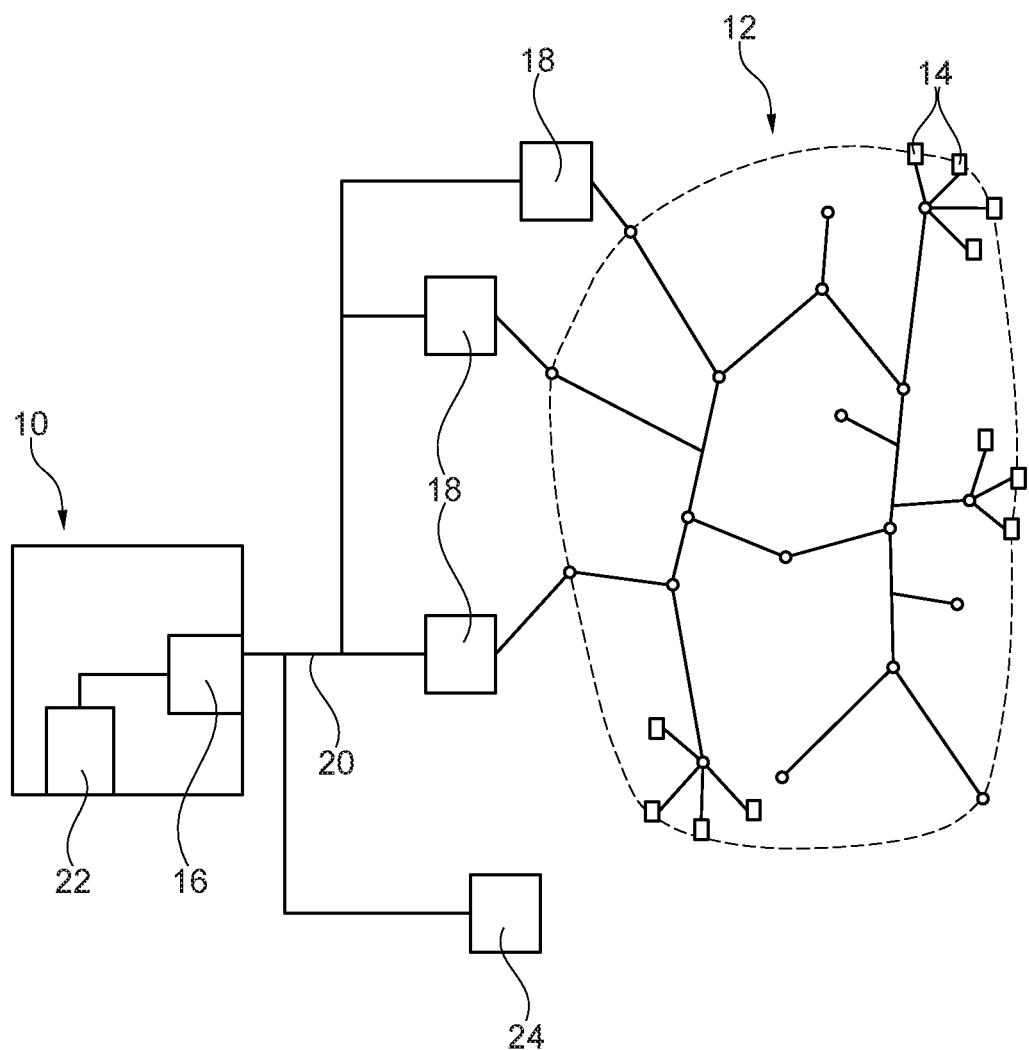
FIG. 1 shows a schematic depiction of one example embodiment of an inventive system for providing real-time information.

FIG. 1 shows a schematic depiction of one example embodiment of an inventive system 10 for providing real-time information relative to regulating the power of a power grid 12.

The power grid 12 comprises a transmission grid 12 or a distribution grid 12.

The power grid 12 is furthermore operatively connected to a plurality of regenerative or renewable power plants 14.

The system 10 comprises a receiver device 16.

Three electronic databases 18 are furthermore provided here, these being connected to the receiver device 16 via a network 20.

It is however also conceivable for only one single database 18, two or also multiple databases 18 to be provided per power grid 12.

The system 10 further comprises a processing or computing device 22 connected to the receiver device 16.

The system 10 further comprises an electronic market master register 24 which is likewise connected to the receiver device 16 via the network 20.

The operation of the system 10 can be described as follows:

The system 10 comprises a receiver device 16 for receiving real-time data from a plurality of electronic databases 18.

The real-time data is associated with a shutdown or downward regulation of the power plants 14 due to a feed-in management of the power grid 12.

The electronic databases 18 are connected to the power grid 12 at various points via respective data interfaces not illustrated to any greater detail in FIG. 1.

The real-time data of the power grid 12 can be transmitted to the electronic databases 18 via the data interfaces.

The electronic databases 18 are decentralized and publicly accessible and associated with the respective power grid 12 or power plant 14 operator.

As outlined above, the system 10 further comprises the processing or computing device 22 for processing the real-time data so that it can be linked or provided as real-time information.

After being processed by the processing or computing device 22, the real-time data can be provided as real-time information to direct-market traders of an electricity market or power grid operators.

Since the respective grid operators supply the real-time data in decentralized manner via the electronic databases 18, the data format, data quality and supply frequency varies.

The different data formats of the real-time data from the respective electronic databases 18 can thereby be converted into a uniform data format by means of the processing or computing device 22 and corrupted data deleted by means of plausibility checks.

The real-time data is thereby associated with a current shutdown or downward regulation of the power plants 14 due to the feed-in management of the power grid 12.

Furthermore, the processing or computing device 22 can link the real-time data of specific power plants 14 as well as their specific current generating of power to further data from a market master data register 24.

In this regard, the processing or computing device 22 can project the available real-time information to different power grid accounting levels (e.g. regional, trans-regional or national).

It is for example thus possible to generate such real-time information for the feed-in management for the country of Germany.

This can be in the form of a map of the power grid 12, or distribution grid or interconnected grid respectively, by means of a graphical representation of the real-time information which visualizes the congestion-afflicted areas of the power grid.

Further graphical representations are likewise conceivable, e.g. a time series in the form of two or three-dimensional graphs of the shutdown or downward regulation of the power plants.

The processing or computing device 22 can additionally provide the real-time information for any given power plant 14 resulting from feed-in management.

This allows the real-time information relative to feed-in management to be furnished at a more geographically detailed level, e.g. for substations or individual power plants.

A mapping algorithm implemented in the processing and/or computing device 22 can additionally link the real-time data for regions such as such as control areas, grid nodes or accounting grids or for individually given portfolios of potentially affected power plants 14.

The processing or computing device 22 can additionally link the real-time data of one or more specific power plants 14 to generation time series of these associated one or more power plants 14 on the basis of different numerical weather forecast models.

The processing or computing device 22 thus provides a validation basis, by means of which the model-based generation time series or the time series for the downward regulating respectively of one or more power plants 14 can be optimized.

In addition to providing the real-time information associated with the current shutdown or downward regulation of renewable or regenerative power plants, the system can also provide forecast data on future shutdowns or downward regulation.

The information provided by the system 10 can thus be real-time information and the data can be real-time data. In this case, the system-specific notifications on the grid operator's grid congestion management can thus for example be combined with a market master data register as well as the current system-specific generation of wind, solar and biomass. This results in the current induced power reduction for each renewable energy installation, which can then be compiled into any desired regions such as control areas, grid nodes or accounting grids using a mapping algorithm.

Alternatively and/or additionally, it is conceivable for the information provided by the system 10 to be forecast information and the data to be forecast data. However, the system 10 is not dependent on the operational messages of the grid operator or other grid operator electronic databases for the forecast. The fundamental model of the forecast preferably includes a load flow model which calculates the future grid load (this requires a grid model, a load model and a system-specific power generation model). In a further step, the grid operator's shutdown logic is for example illustrated using a congestion management algorithm.

The data is thereby associated with a future shutdown or downward regulation of the power plants 14 resulting from the feed-in management of the power grid 12 in the form of forecast data.

This information in the form of forecasts is likewise associated with a future shutdown or downward regulation of the power plants 14 as a result of the feed-in management of the power grid 12.

The basis for the most precise possible furnishing of model-based forecast information is grasping where and when future power feed/power load of the power grid will occur.

To that end, the forecast information can be determined by the processing or computing device 22 as well as by means of a load flow model of the power grid 12 implemented therein for calculating its future power feed.

Figure 2:
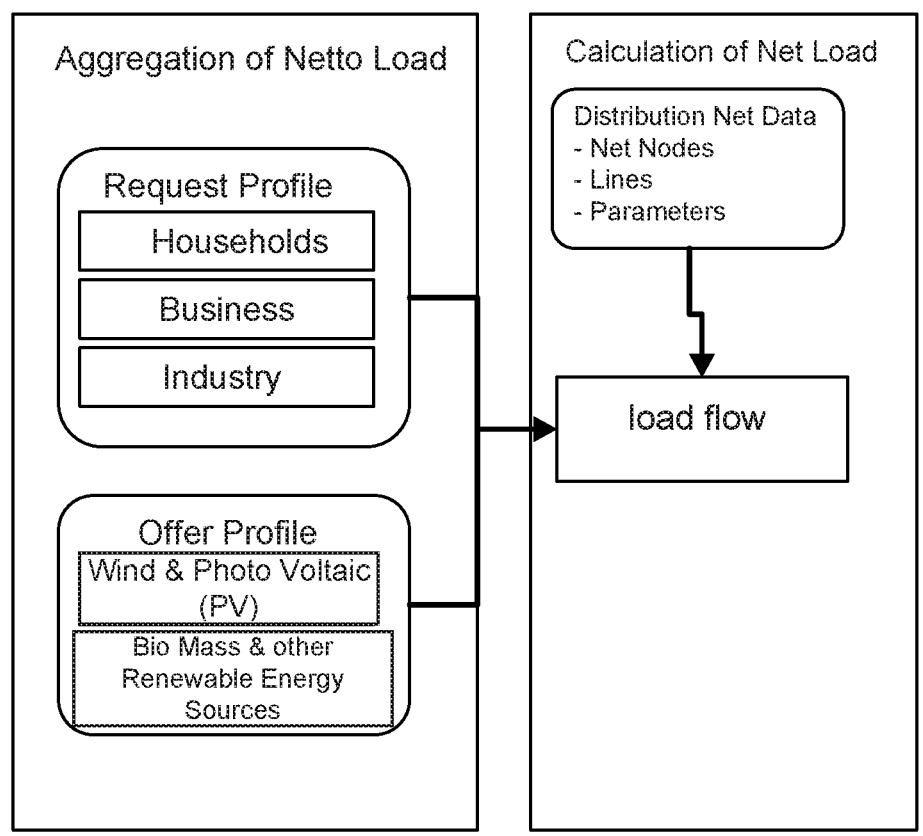
FIG. 2 shows a schematic depiction of a load flow model of the power grid implemented in the processing or computing device.

FIG. 2 shows such a schematic representation of a load flow model of the power grid 12 implemented in the processing or computing device 22.

In respect thereof, a power grid model, a load model as well as a power generating model (e.g. wind and solar generation) are provided as input parameters for the load flow model.

The power grid model for example illustrates a typical distribution grid area frequently affected by feed-in management measures.

Knowing the distribution grid area topology as well as the technical systems incorporated therein such as substations and lines is particularly important.

Such a distribution grid area is for example the distribution grid of a regional energy supplier located in northern Germany which is the one most frequently affected in Germany by feed-in management measures due to the various integrated renewable power plants in the form of e.g. onshore wind farms.

However, this scenario is to be understood as just an example and can also apply to other regions, countries, subcontinents and/or continents.

The load model represents the power consumption of the electrical loads (e.g. industrial or residential) connected to the power grid, e.g. the previously cited distribution grid.

Based on standard load profiles at the municipality level, a regionalization by shortest distance can be applied to the entire power grid based on Voronoi network infrastructure (see: Joswig, M., Theobald, T., "Polyhedral and Algebraic Methods in Computational Geometry," Springer, ISBN 978-3-8348-9440-3, 2008").

On the basis of the load model for industrial, commercial and residential load, power consumption time series can be determined by the processing or computing device 22.

For the most accurate provision of forecast information possible, it is also necessary to determine the power generation time series in addition to determining the power consumption time series.

The power generation time series for solar generation plants and/or wind energy plants can therefore be determined by the processing or computing device 22 on the basis of the power generating model in the form of power generation forecasts for the power plants 14 based on different numerical weather forecasts, each able to be optimized and combined, as well as for further baseload power plants.

Baseload power plants are for example biogas or biomass facilities or hydro, coal or nuclear power plants.

Additionally to grasping where and when which future power feed/power load of the power grid will occur, the provision of forecast information requires knowing which and how many power plants are to be regulated downward or shut down over what period of time in the context of the feed-in management of the power grid.

Therefore, the forecast information can be determined by means of the load flow model implemented in the processing or computing device 2 on the basis of the one or more power plants 14 which have a maximum nodal impact on congestion of the power grid 12. A congestion management algorithm is used to select the power plants exhibiting maximum nodal impact on a congestion of the power grid.

Figure 3:
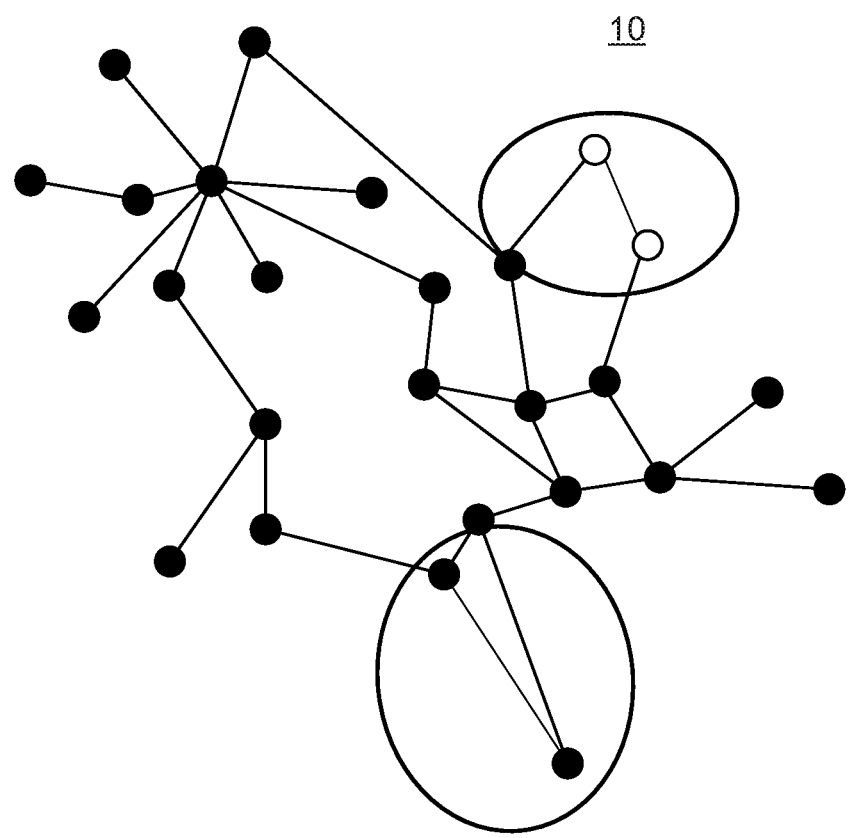
FIG. 3 shows a schematic depiction of two congestions in the power grid determined by means of the processing or computing device and the load flow model.

FIG. 3 shows in this regard a schematic depiction of two congestions in the power grid 12 determined by means of the processing or computing device 22 and the load flow model.

The power plants 14 having the maximum nodal impact can thus be determined by the processing or computing device 22 and can for example be visualized in a graphically implemented grid model as forecast information.

Figure 4:
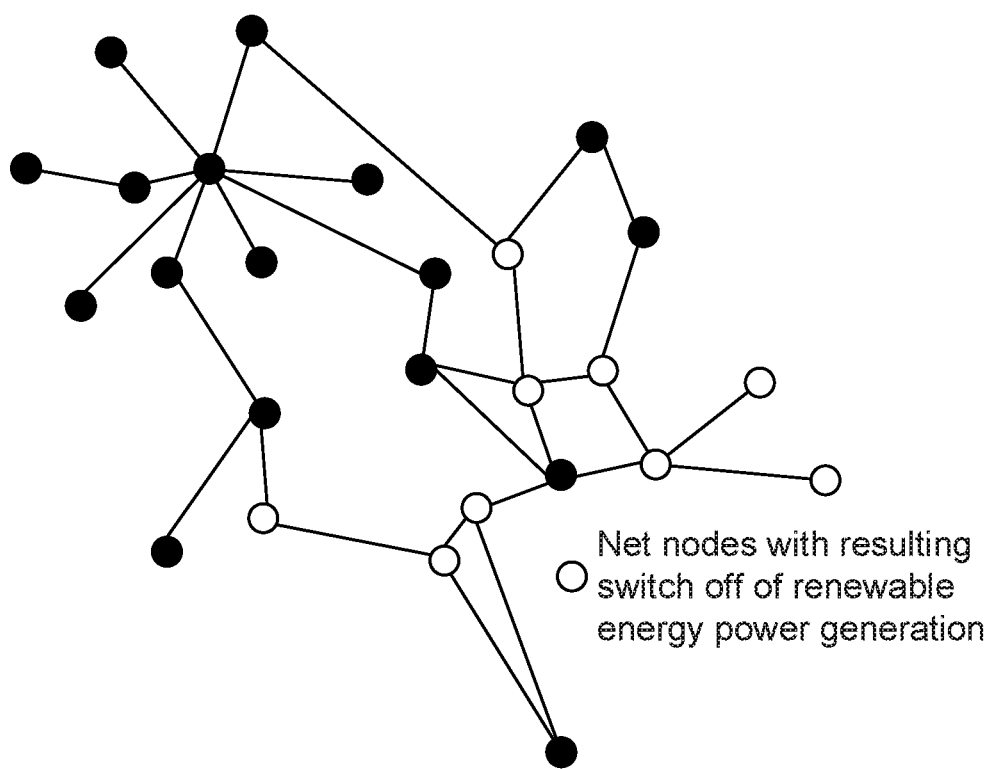
FIG. 4 shows a schematic depiction of power plants having maximum nodal impact on both of the grid congestions depicted in FIG. 3.

FIG. 4 shows in this regard a schematic depiction of those power plants 14 having a maximum nodal impact on the two grid congestions depicted in FIG. 3.

Further graphical representations are likewise conceivable, e.g. a time series in the form of two or three-dimensional graphs of the projected shutdown or downward regulation of the power plants, e.g. within a distribution grid.

The system 10 can likewise provide more geographically detailed information on the projected shutdown or downward regulation of the power plants 14.

The processing or computing device 22 can thus provide forecast information for any given power plant 14 as a consequence of feed-in management.

Additionally, a mapping algorithm implemented in the processing and/or computing device 22 can link the forecast information for regions such as such as control areas, grid nodes or accounting grids or for individually given portfolios of potentially affected power plants 14.

Since the majority of feed-in management measures occur in the distribution grid previously described as an example, the mapping algorithm can determine which future feed-in management measures are to be expected, e.g. in Germany and/or on a subcontinental, continental or global scale, based on the forecast information for the distribution grid.

As described herein, the system described above addresses technical issues related to providing increased renewable energy into a power distribution system. One issue with renewable energy sources is that they may be very volatile, whereas the power distribution system works more efficiently with more stable energy source levels to provide a more stable load level throughout a region of the grid, such as a given country. Thus, a more accurate forecast of energy consumption and availability may implemented in an online/real-time system, and thus in coordination with the actual operation of the power distribution system such that within the running power distribution system over the whole region, increased stability for the whole distribution network is provided. As recognized by the inventors when solving these technical issues, weather forecasts play a substantial role in the management of the distribution system as the forecast will substantially influence energy consumption (e.g. heating). In one example, the approach described herein is used in coordination with management of the real-world distribution system (e.g., by adjusting actual operation of the distribution) to increase the efficiency of that distribution and better utilizing the renewable energy. For example, the system described herein may include and be coupled with the power distribution and the control system of that power distribution system.

LIST OF REFERENCE NUMERALS 10 system
12 power grid
14 power plants
16 receiver device
18 electronic database
20 network
22 processing or computing device
24 market master register

The invention claimed is:

1. A system for furnishing information relative to regulating power of at least one power grid, wherein the power grid comprises at least one transmission grid and/or at least one distribution grid, and wherein the power grid is operatively connected to a plurality of particularly regenerative or renewable power plants,
   wherein the system comprises at least one receiver device for receiving data from at least one electronic database connected to the receiver device via a network,
   wherein the data is associated with a shut down and a downward regulation of the power plants in consequence of a feed-in management of the power grid,
   wherein the system further comprises a processing and/or computing device with instructions for processing the data;
   wherein the information is real-time information and the data associated with the shut down and the downward regulation is real-time data, and wherein the instructions are stored in non-transitory memory coupled in the computing device;
   wherein the processing and/or computing device converts different data formats of the real-time data from respective electronic databases into a uniform data format and quality of the real-time data of the different electronic databases is increased by algorithms which run plausibility checks;
   wherein the processing and/or computing device is set up to process model-based data so that same are linked to forecast information, and wherein the forecasted information is associated with a future shut down and downward regulation of the power plants in consequence of the feed-in management of the power grid;
   wherein the processing and/or computing device determines power consumption time series for industrial, commercial, and residential loads on the basis of a load model, and wherein the processing and/or computing device determines power generation time series on the basis of a power generation model in the form of renewable energy power generation forecasts for the power plants based on numerical weather forecasts as well as for further baseload power plants.

2. The system according to claim 1, wherein the receiver device is connected over the network to a plurality of particularly decentralized and publicly accessible electronic databases of respective operators of the power grid and/or the power plants.

3. The system according to claim 1, wherein the real-time data is associated with a current shut down and downward regulation of the power plants in consequence of the feed-in management of the power grid.

4. The system according to claim 1, wherein the processing and/or computing device links the real-time data of specific power plants as well as their specific current power generation to further data from a market master data register.

5. The system according to claim 1, wherein the processing and/or computing device provides the real-time data for any given power plant resulting from the feed-in management and a mapping algorithm implemented in the processing and/or computing device links same together for regions including control areas, grid nodes, or accounting grids, or for individually given portfolios of potentially affected power plants.

6. The system according to claim 1, wherein the processing and/or computing device links the real-time data of one or more specific power plants to generation time series of said associated one or more power plants based on different numerical weather forecast models.

7. The system according to claim 1, wherein the forecast information is determined by means of the processing and/or computing device as well as by means of a load flow model of the power grid implemented therein for calculating its future power feed, wherein a power grid model, a load model, as well as a power generation model are provided as input parameters for the load flow model.

8. The system according to claim 1, wherein the forecast information is determined by means of a load flow model implemented in the processing and/or computing device based on one or more power plants which have a maximum nodal impact on congestion in the power grid.

9. The system according to claim 1, wherein the processing and/or computing device provides the forecast information on any given power plant and any desired forecast horizons resulting from feed-in management and a mapping algorithm implemented in the processing and/or computing device links same together for regions including control areas, grid nodes, or accounting grids, or for individually given portfolios of potentially affected power plants.

* * * * *